United States Patent
Oh et al.

(10) Patent No.: US 7,939,965 B2
(45) Date of Patent: May 10, 2011

(54) CHARGE OF EQUALIZATION APPARATUS WITH PARALLEL CONNECTION OF SECONDARY WINDINGS OF MULTIPLE TRANSFORMERS

(75) Inventors: Jeon Keun Oh, Daejeon (KR); Joong Hui Lee, Daejeon (KR); Soo Yeup Jang, Daejeon (KR); Gun Woo Moon, Daejeon (KR); Chong Eun Kim, Daejeon (KR); Hong Sun Park, Daejeon (KR)

(73) Assignees: SK Energy Co., Ltd., Seoul (KR); Korea Advanced Institute of Science and Technology, Daejeon (KR)

( * ) Notice: Subject to any disclaimer, the term of this patent is extended or adjusted under 35 U.S.C. 154(b) by 161 days.

(21) Appl. No.: 12/302,373

(22) PCT Filed: Jun. 12, 2007

(86) PCT No.: PCT/KR2007/002829
§ 371 (c)(1),
(2), (4) Date: May 1, 2009

(87) PCT Pub. No.: WO2007/145460
PCT Pub. Date: Dec. 21, 2007

(65) Prior Publication Data
US 2009/0322155 A1    Dec. 31, 2009

(30) Foreign Application Priority Data
Jun. 15, 2006   (KR) .................. 10-2006-0054056

(51) Int. Cl.
H02J 1/10          (2006.01)
(52) U.S. Cl. ...................... 307/43; 307/48; 307/50
(58) Field of Classification Search .............. 307/43, 307/48, 50
See application file for complete search history.

(56) References Cited

U.S. PATENT DOCUMENTS

| | | |
|---|---|---|
| 5,594,320 A | 1/1997 | Pacholok et al. |
| 5,965,996 A | 10/1999 | Arledge et al. |
| 6,538,414 B1 | 3/2003 | Tsuruga et al. |
| 2005/0140335 A1* | 6/2005 | Lee et al. .............. 320/118 |

* cited by examiner

*Primary Examiner* — Robert L. Deberadinis
(74) *Attorney, Agent, or Firm* — McDermott Will & Emery LLP (57) ABSTRACT

The present invention relates, in general, to a charge equalization apparatus with series-connected battery cells and, more particularly, to a charge equalization apparatus, in which series-connected battery cells (B1 to BN) are connected in parallel with the primary windings (Mi 1 to M1N) of transformers (T1 to TN), switches (S1 to SN) for controlling the flow of current of the primary windings are connected in series with the primary windings (M1 1 to M1N), and multiple secondary windings (M21 to M2N) corresponding to the primary windings are connected in parallel with each other.

16 Claims, 9 Drawing Sheets

FIG. 1

PRIOR ART

CHARGE OF EQUALIZATION APPARATUS WITH PARALLEL CONNECTION OF SECONDARY WINDINGS OF MULTIPLE TRANSFORMERS

CROSS-REFERENCE OF RELATED APPLICATIONS

This application is a US National Phase Application under 35 U.S.C. §371 of International Patent Application No. PCT/KR2007/002829 filed Jun. 12, 2007, which claims priority to and the benefit of Korean Patent Application No. 10-2006-0054056, filed Jun. 15, 2006, each of which are hereby incorporated by reference in their entireties. The International Application published as WO 2007/145460 on Dec. 21, 2007

TECHNICAL FIELD

The present invention relates, in general, to a charge equalization apparatus with series-connected battery cells and, more particularly, to a charge equalization apparatus, in which series-connected battery cells are connected in parallel with the primary windings of transformers, switches for controlling the flow of current of the primary windings are connected in series with the primary windings, and multiple secondary windings corresponding to the primary windings are connected in parallel with each other.

BACKGROUND ART

A plurality of systems uses a battery implemented as a battery pack or battery array, including a plurality of battery cells connected in series with each other.

When such a battery cell is charged to a much higher voltage or a much lower voltage than the voltage within a rated charge range, it may be dangerous.

Imbalance in the charged state of battery cells is caused by various factors, and occurs during the manufacture of batteries or the charge/discharge of batteries. In the case of lithium ion cells, the manufacture of cells is strictly controlled within a company to minimize the differences between the capacities of the cells of a battery array. However, imbalance or inequality between cells may occur due to various factors, regardless of the states of the cells, in which balance or equality is maintained after the cells are initially manufactured.

The factors influencing the imbalance of cells may include, for example, the chemical reactions, impedances and self-discharge rates of respective cells, reduction of the capacities of the cells, variation in the operating temperatures of the cells, and other types of variation between the cells.

Inconsistency in the temperature of cells is an important factor responsible for causing imbalance in cells. For example, "self-discharge" is caused in a battery cell, and is a function of a battery temperature. A battery having a high temperature typically has a self-discharge rate higher than that of a battery having a low temperature. As a result, the battery having a high temperature exhibits a lower charged state than the battery having a low temperature, with the passage of time.

Imbalance is a very series problem in the charged state of a battery. For example, this problem may typically occur in electric vehicles, and the capability of a battery to supply energy is limited by the battery cell having the lowest charged state.

If one of series-connected batteries is fully consumed, other battery cells lose the ability to continue to supply energy. This is the same even if the other battery cells of the battery still have the ability to supply power. Therefore, an imbalance in the charged state of battery cells reduces the power supply capability of the battery.

Of course, the above description does not mean that when one or more battery cells are consumed the supply of power by the remaining battery cells is completely impossible. However, it means that, only in the case of series connection, even if one or more battery cells are fully consumed, the battery can be continuously used as long as charge remains in the remaining battery cells, but, in that case, voltage having a reversed polarity is generated in the battery cell which has been fully discharged, and, as a result, the battery cell may be in danger of explosion due to the overheating thereof, or due to the generation of gas, and thus the battery loses power supply capability.

Figure 1:
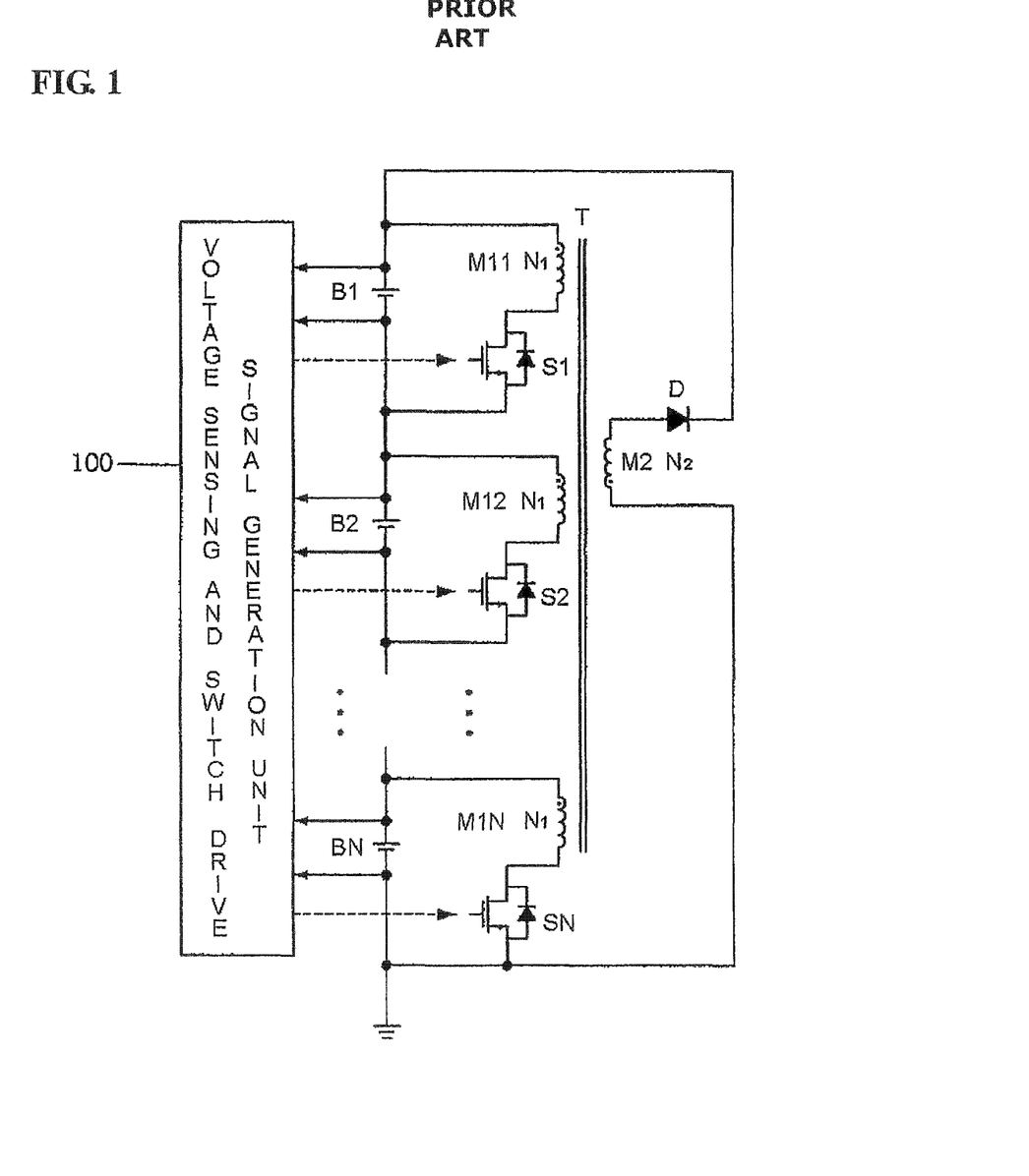
FIG. 1 is a diagram showing the construction of a conventional charge equalization apparatus having series-connected battery cells using current switching.

Various methods of correcting an imbalance in the charged state of battery cells have been proposed, and one of the methods is shown in FIG. 1.

FIG. 1 is a diagram showing the construction of a conventional charge equalization apparatus with series-connected battery cells using current switching.

Referring to FIG. 1, a plurality of battery cells B1 to BN is connected in series, and is connected in parallel with the primary windings M11 to M1N of a transformer T. Further, switches S1 to SN are connected in series with respective primary windings M11 to M1N, and the battery cells B1 to BN, connected in series, are connected in parallel with the secondary winding M2 of the transformer T. In this case, all of the primary windings M11 to M1N are wound around a single common core.

The primary windings M11 to M1N of the transformer T have the same number of turns and the same polarity, and the secondary winding M2 of the transformer T has polarity opposite that of the primary windings M11 to M1N, and is connected in series with a rectifier diode D. The cathode of the rectifier diode D is connected to the anodes of the series-connected batteries B1 to BN, so that current flowing from the cathode of the rectifier diode D flows into the anodes of the series-connected battery cells B1 to BN.

Further, a voltage sensing and switch drive signal generation unit 100 senses voltages at both ends of respective battery cells B1 to BN, and turns on/off the switches S1 to SN according to a preset scheme.

In detail, the voltage sensing and switch drive signal generation unit 100 senses the voltages of the battery cells B1 to BN, and drives a corresponding switch S1 to SN when the voltage of a specific one of the battery cells B1 to BN is higher than a predetermined voltage, thus discharging the charge from the specific one of the battery cells B1 to BN. In this case, the discharged charge flows through the transformer T, with the charge converted into magnetic energy by the transformer T, the magnetic energy is converted back into charge when it encounters a battery cell B1 to BN having a relatively low potential, and the charge flows into the battery cell B1 to BN. At this time, a larger amount of charge flows into a battery cell B1 to BN having a relatively lower potential, thus realizing charge equalization.

However, according to the prior art, there is a problem in that, since a plurality of primary windings corresponding to the number of battery cells must be wound around a single common core, it is difficult to manufacture a transformer when the number of series-connected battery cells increases.

Further, in the prior art, the voltages of the series-connected battery cells are applied to the primary windings for a period during which a switch is turned off to prevent the saturation of the transformer. At this time, the turns ratio of the primary winding to the secondary winding is N (the number of series-connected battery cells), and thus it is difficult to manufacture a secondary winding as the number of battery cells increases.

DISCLOSURE

Technical Problem

Accordingly, the present invention has been made keeping in mind the above problems, and the present invention is intended to provide a charge equalization apparatus, which uses a plurality of transformers corresponding to the number of battery cells, and in which the battery cells are connected in parallel with the primary windings of respective transformers, and all secondary windings are connected in parallel with each other, thus facilitating the manufacture of transformers while maintaining the excellent charge equalization performance of existing current switches.

In addition, the present invention is intended to provide a charge equalization apparatus, which uses a number of transformers corresponding to the number of battery cells, thus realizing design flexibility from the standpoint of spatial arrangement.

Technical Solution

In accordance with an aspect of the present invention, there is provided a charge equalization apparatus, comprising a plurality of transformers having primary windings and secondary windings wound around the transformers, the primary windings being connected in parallel with batteries, the second windings being connected in parallel with each other; a plurality of first switches respectively connected in series with the primary windings of the transformers and adapted to control flow of current of the primary windings in a first direction or a second direction; a plurality of battery cells connected in series with each other, the battery cells being connected in parallel with the primary windings of the transformers; and a voltage sensing and switch drive signal generation unit for sensing voltages of the plurality of battery cells, thus turning on/off the plurality of first switches, wherein the charge equalization apparatus is operated such that, when one or more of the first switches are turned on, current flows into one or more primary windings connected to the turned-on first switches in the first direction, so that current is induced in the second windings, and current is induced in the primary windings because of the current induced in the secondary windings, thus enabling equalized charge to be distributed to the plurality of battery cells.

In accordance with another aspect of the present invention, there is provided a charge equalization apparatus, comprising a plurality of transformers, each having a plurality of primary windings and a single secondary winding wound around a single core, the primary windings being connected in parallel with respective battery cells, the secondary windings of the transformers being connected in parallel with each other; a plurality of first switches connected in series with the primary windings of the transformers and adapted to control flow of current of the primary windings in a first direction or a second direction; a plurality of battery cells connected in series with each other, the battery cells being connected in parallel with the primary windings of the transformers; and a voltage sensing and switch drive signal generation unit for sensing voltages of the plurality of battery cells, thus turning on/off the first switches, wherein the charge equalization apparatus is operated such that, when one or more of the first switches are turned on, current flows into one or more primary windings connected to the turned-on first switches in the first direction, so that current is induced in the second windings, and current is induced in the primary windings because of the current induced in the secondary windings, thus enabling equalized charge to be distributed to the plurality of battery cells.

ADVANTAGEOUS EFFECTS

According to the present invention, there is an advantage in that it facilitates the implementation of a charge equalization apparatus while maintaining the excellent charge equalization performance of a conventional charge equalization apparatus using current switching.

That is, in a conventional charge equalization apparatus using current switching, since a number of primary windings corresponding to the number of battery cells must be wound around a single large common core to realize charge equalization, it is difficult to actually realize the charge equalization apparatus as the number of battery cells increases. In contrast, the present invention uses a number of small-sized transformers corresponding to the number of battery cells, and enables secondary windings to be electrically connected in parallel with each other, thus facilitating the implementation of a charge equalization apparatus while maintaining the excellent charge equalization performance of an existing charge equalization apparatus using current switching.

Further, the present invention is advantageous in that, since a second switch is interposed between secondary windings and a 14V battery, the potential of the 14V battery can be decreased using the second switch when an arbitrary battery, constituting series-connected battery cells, is in a low charged state.

Further, the present invention is advantageous in that the voltage of a 14V battery, essentially provided in a vehicle, is applied to secondary windings for the interval during which first switches are turned off, so that the voltage stress on a second switch can be decreased while the saturation of the transformers can be prevented, and the turns ratio of the transformers can be decreased, thus facilitating the implementation of the secondary windings of transformers.

That is, the conventional charge equalization apparatus using current switching prevents the saturation of a transformer by applying the entire voltage of series-connected battery cells to the secondary winding of the transformer for the period during which first switches are turned off. However, in this construction, when the turns ratio of the transformer is set to 1:N (where N is the number of series-connected battery cells), voltage stress on the first switches decreases, whereas voltage stress on a diode increases. In addition, the manufacture of the secondary winding of the transformer becomes difficult as the number of battery cells increases. In contrast, in the present invention, the voltage of a 14V battery, essentially provided in a vehicle, is applied to the secondary windings for a period during which first switches are turned off, so that voltage stress on a second switch is decreased while the saturation of transformers is prevented, and the turns ratio of the transformers is decreased, thus facilitating the implementation of the secondary windings of transformers.

DESCRIPTION OF REFERENCE CHARACTERS OF IMPORTANT PARTS

| T1~TN, T0: transformer | M11~M1N, M01: primary winding |
| M21~M2N, M02: secondary winding | S1~SN, S0: switch |
| B1~BN: battery cell | B0: battery |
| D, D1, D2: diode | C: capacitor |

Best Mode

Figure 2:
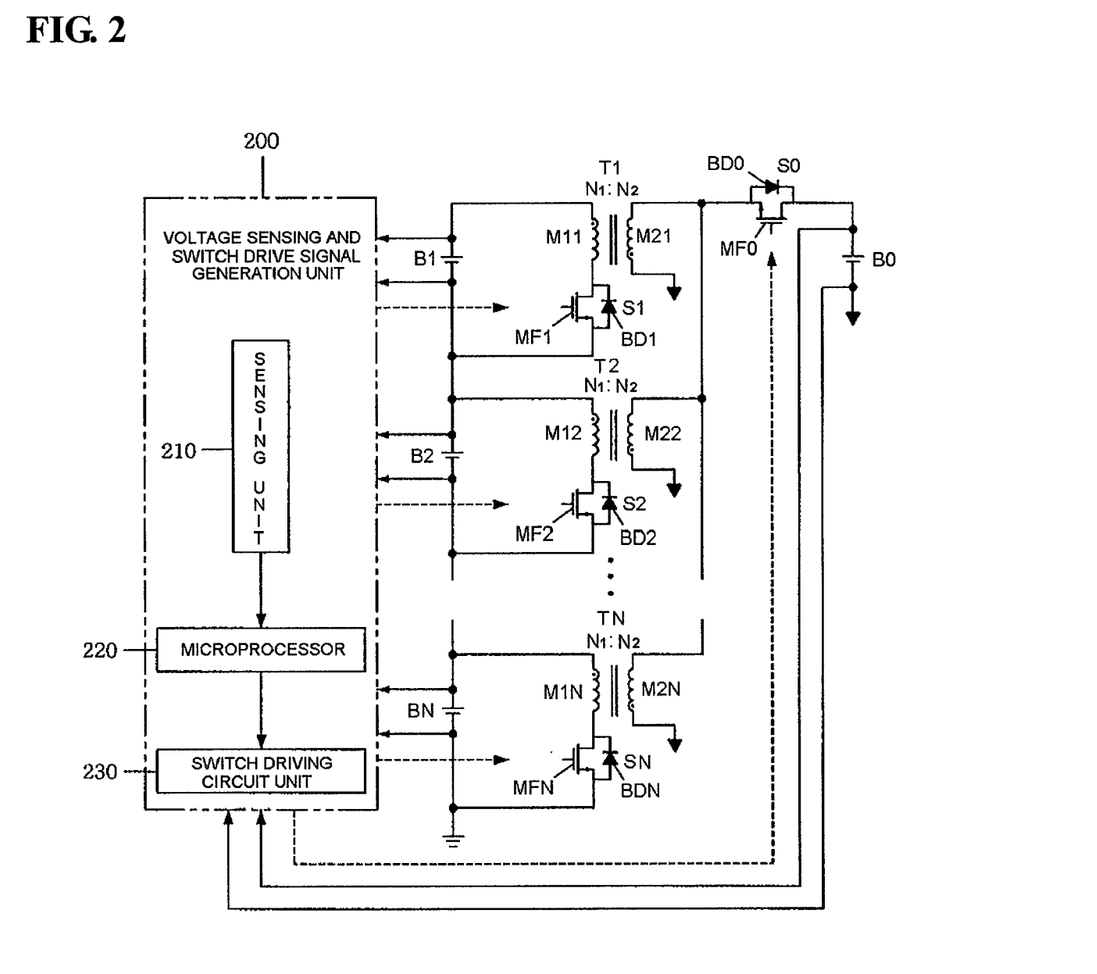
FIG. 2 is a diagram showing the construction of a charge equalization apparatus with the parallel connection of the secondary windings of multiple transformers according to an embodiment of the present invention.

FIG. 2 is a diagram showing the construction of a charge equalization apparatus with the parallel connection of the secondary windings of multiple transformers according to an embodiment of the present invention.

Referring to the drawing, the charge equalization apparatus with the parallel connection of the secondary windings of multiple transformers is constructed so that transformers T1 to TN corresponding to respective battery cells B1 to BN are provided and have respective cores, and primary windings M11 to M1N and secondary windings M21 to M2N are wound around respective cores.

That is, in the case of a conventional charge equalization apparatus using current switching, a number of primary windings corresponding to the number of battery cells B1 to BN is wound around a common core, and a single secondary winding is wound around the core. In contrast, in the present invention, a number of transformers T1 to TN corresponding to the number of battery cells B1 to BN is used, so that a number of cores corresponding to the number of battery cells B1 to BN is provided, and the primary winding M11 to M1N and the secondary winding M21 to M2N are wound around each of the cores.

The primary windings M11 to M1N preferably have the same number of turns N1, but may have different numbers of turns according to the application. Further, in the present invention, since a number of transformers T1 to TN corresponding to the number of battery cells B1 to BN is used, cores are separately provided, and thus the turns ratio is more important in relation to the secondary windings M21 to M2N. All of the transformers T1 to TN preferably have the same turns ratio of N1:N2, but may have different turns ratios according to the application. Here, the term 'turns ratio' means the ratio of the number of turns N1 in the primary windings to the number of turns N2 in the secondary windings, that is, N1:N2, and is related to the amount of voltage and current. The voltage of the primary windings and the voltage of the secondary windings are proportional to the number of turns, and the current of the primary windings and the current of the secondary windings are inversely proportional to the number of turns.

In this case, the polarity of the primary windings M11 to M1N of all transformers T1 to TN is opposite that of the secondary windings M21 to M2N, which means that, in the case where dots are marked on the upper portions of the primary windings of the transformers T1 to TN, dots are marked on the lower portions of the secondary windings. The primary windings M11 to M1N of all transformers T1 to TN have the same polarity, which is represented in the drawing by dots marked on the upper portions of the transformers. This means that the DC/DC converters of all cells are implemented using flyback converters.

Further, the primary windings M11 to M1N of all transformers T1 to TN are connected in parallel with the battery cells, and have first ends connected in series with the first switches S1 to SN corresponding to the primary windings M11 to M1N, respectively.

Respective first switches S1 to SN include first Metal Oxide Semiconductor Field Effect Transistors (MOSFETs) MF1 to MFN and first body diodes BD1 to BDN, which are disposed in a reverse direction between the drains and sources of the first MOSFETs MF1 to MFN. The gates of the first MOSFETs MF1 to MFN are connected to the switching driving circuit unit 230 of a voltage sensing and switch drive signal generation unit 200. In this embodiment, for the convenience of description, each of the first switches S1 to SN is divided into the MOSFET MF1 to MFN and the body diode BD1 to BDN, but, in practice, the body diode BD1 to BDN cannot be separated from the MOSFET MF1 to MFN due to the inherent properties of the MOSFET. MOSFET switches have been described as an example of the first switches S1 to SN, but diodes, Bipolar Junction Transistor (BJT) switches, relay switches, etc., can used as the first switches S1 to SN.

Each of the first MOSFETs MF1 to MFN of the first switches S1 to SN performs ON/OFF operation in response to a control signal input from the switch driving circuit 230 of the voltage sensing and switch drive signal generation unit 200, so that, during an ON period, current flows from the drain to the source, and, during an OFF period, the flow of current from the drain to the source is interrupted. Further, the first body diodes BD1 to BDN of the first switches S1 to SN interrupt the flow of current from the drains to sources of the first MOSFETs MF1 to MFN, and cause current to flow from the sources to drains thereof. Therefore, the first switches S1 to SN can make reverse current, flowing from the sources to drains, flow through the first body diodes BD1 to BDN even for the period during which the first MOSFETs MF1 to MFN are turned off.

Meanwhile, the primary windings M11 to M1N are connected in parallel with corresponding battery cells B1 to BN.

In this case, the battery cells B1 to BN are charged to a certain voltage, are adapted to discharge or charge current, and are connected to the voltage sensing and switch drive signal generation unit 200. The battery cells B1 to BN are connected in series with each other, and the first end of the series-connected batteries are connected in parallel with the primary windings M11 to M1N of the transformers T1 to TN.

The secondary windings M21 to M2N are connected in parallel with each other, and have the same number of turns N2, but may have different numbers of turns according to the application. Further, the secondary windings M21 to M2N have the same polarity, and dots are marked on the lower portions of respective secondary windings in the drawing.

Further, first ends of the parallel-connected secondary windings M21 to M2N are connected in series with a second switch SO, and the first end of the second switch SO, connected in series with the secondary windings M21 to M2N, is connected in parallel with a battery BO. The second switch SO includes a second MOSFET MFO, the drain of which is connected to the second battery BO and the source of which is connected to the first ends of the parallel-connected secondary windings M21 to M2N, and a second body diode BDO, which is interposed in a reverse direction between the drain and source of the second MOSFET MFO. The battery BO is preferably implemented using a 14V battery generally used in a vehicle. Of course, the battery BO is an example of a charging means, and a capacitor can alternatively be used as the charging means.

When the second switch SO having the above construction is used, magnetic energy generated from the secondary windings M21 to M2N is charged in the battery BO through the second body diode BDO of the second switch SO during a charge equalization operation, in which the voltage of the battery cells B1 to BN is used as power. Further, when an arbitrary battery cell of the battery cells B1 to BN is in a low charged state, the second switch SO is turned on, and the battery cell B1 to BN can be charged using the battery BO. In order to improve the charge efficiency of the battery cells B1 to BN, only the first switch S1 to SN corresponding to the battery cell in the low charged state is turned on. Description has been made of the particular case where the second switch SO is a MOSFET switch by way of example, but a diode, a BJT switch, or a relay switch can be used as the second switch. Meanwhile, the voltage sensing and switch drive signal generation unit 200 includes a sensing unit 210, a microprocessor 220, and the switch driving circuit unit 230.

The sensing unit 210 is connected in parallel with respective battery cells B1 to BN, and is adapted to sense the voltages of respective battery cells B1 to BN and to output the sensed voltages.

The microprocessor 220 determines the time to turn on/off the first and second switches S1 to SN and SO, on the basis of the voltage states of respective battery cells B1 to BN, which are input from the sensing unit 210, according to a preset scheme.

In this case, as an example of the scheme by which the microprocessor 220 determines the ON/OFF time of the first switches S1 to SN, determination may be performed so that, when all of the voltage values of the battery cells B1 to BN are received and the difference between the maximum and minimum values of the voltage values is equal to or greater than a predetermined value, the first switches are turned on. As another example of the scheme, determination may be performed so that, when voltage values of neighboring battery cells B1 to BN are compared with each other and the difference therebetween deviates from a predetermined range, the first switches are turned on.

Meanwhile, when an ON signal is input from the microprocessor 220, the switch driving circuit unit 230 generates and outputs a drive signal, required to turn on the first and second switches S1 to SN and SO, in response to the ON signal. When an OFF signal is input from the microprocessor 220, the switch driving circuit unit 230 generates and outputs a drive signal required to turn off the switches S1 to SN and SO in response to the OFF signal.

The drive signal generated by the switch driving circuit unit 230 may be a Pulse Width Modulated (PWM) signal.

Next, with reference to FIG. 2, the operation of the charge equalization apparatus according to the embodiment of the present invention is described below.

The sensing unit 210 senses the voltages of respective battery cells B1 to BN and outputs the sensed voltages to the microprocessor 220.

The microprocessor 220 determines whether to turn on or off the first switches S1 to SN on the basis of the voltage states of respective battery cells B1 to BN, which are input from the sensing unit 210, according to a preset scheme, and outputs a drive control signal corresponding to the determination to the switch driving circuit unit 230. In this case, the schemes that can be selected by the microprocessor 220 may include 1) a scheme in which one of the first switches S1 to SN corresponding to the battery cell B1 to BN having the highest potential is turned on, 2) the scheme in which all of the first switches S1 to SN are turned on, and 3) the scheme in which the battery cells B1 to BN having a high potential are selected, and the first switches S1 to SN corresponding to the selected battery cells B1 to BN are turned on.

As described above, when the microprocessor 220 outputs a drive control signal required to turn on/off the first switches S1 to SN according to a preset scheme, the switch driving circuit unit 230 generates and outputs a drive signal required to turn on the first switches S1 to SN in response to the drive control signal. Further, when an OFF signal is input from the microprocessor 220, the switch driving circuit unit 230 generates and outputs a drive signal required to turn off the first switches S1 to SN in response to the OFF signal.

Meanwhile, the operation of the multiple transformers T1 to TN, performed when the first switches S1 to SN are turned on, varies depending on which one of the first switches S1 to SN is turned on. This operation is described below.

1) Case where Only a First Switch Connected to a Battery Cell Having the Highest Potential is Turned on (that is, when a single first switch is turned on)

The case where only a first switch S1 to SN connected to a battery cell (one of B1 to BN) having the highest potential is turned on is described. First, when a given first switch (one of S1 to SN) is turned on according to a predetermined duty ratio, the highest voltage is applied to the primary winding (one of M11 to M1N) of a transformer (one of T1 to TN) corresponding to the first switch.

Further, the voltage applied to the primary winding (one of M11 to M1N) is induced in a corresponding secondary winding (one of M21 to M2N) through the corresponding transformer (one of T1 to TN). All secondary windings M21 to M2N are electrically connected in parallel with each other, so that the voltage (the voltage of the battery cell having the highest potential) induced in the secondary winding (one of M21 to M2N) is equally applied to the secondary windings M21 to M2N of all of the transformers T1 to TN. Then, the voltage of the secondary windings M21 to M2N of respective transformers T1 to TN is induced in the primary windings M11 to M1N of the transformers T1 to TN. Since the voltage induced in the primary windings M11 to M1N is much higher than that of the battery cells B1 to BN, the flow of charge from the primary windings M11 to M1N to the battery cells B1 to BN is induced, and, at the same time, magnetizing current is supplied to magnetizing inductors (not shown) connected in parallel with the primary windings M11 to M1N. At this time, since, in the first switches S1 to SN, the MOSFETs MF1 to MFN are turned off, reverse current flows from the sources to the drains of the MOSFETs MF1 to MFN through the first body diodes BD1 to BDN.

Finally, when a corresponding switch (one of S1 to SN: the switch S1 to SN connected to the battery cell B1 to BN having the highest potential in this embodiment) is turned off, the flow of charge that moves to the battery cell B1 to BN (when charge moves to the battery cell B1 to BN having a low potential) is stopped, and the magnetizing current of the magnetizing inductors (not shown) of all of the transformers T1 to TN flows into a 14 V battery B0, essentially provided in a vehicle, through the secondary windings M21 to M2N of the transformers T1 to TN and the second body diode BDO of the second switch SO.

2) Case where all Switches are Simultaneously Turned on

First, when all of the first switches S1 to SN are turned on according to a predetermined duty ratio, the voltages of the battery cells B1 to BN are intended to be applied to the primary windings M11 to M1N of the transformers T1 to TN without change. Further, the voltages applied to the primary windings M11 to M1N are induced in the secondary windings M21 to M2N of the transformers T1 to TN.

However, all of the secondary windings M21 to M2N are electrically connected in parallel with each other, so that the highest voltage of the voltages induced in the secondary windings M21 to M2N is determined to be a representative voltage of the secondary windings M21 to M2N.

Thereafter, the representative voltage of the secondary windings M21 to M2N is induced in the primary windings M11 to M1N of all of the transformers T1 to TN, thus causing the following two operations. The first operation is the operation corresponding to the case where the representative voltage induced in the primary windings M11 to M1N is much higher than the voltages of the battery cells B1 to BN, so that magnetizing current is supplied to magnetizing inductors (not shown) while charge is caused to flow from the primary windings M11 to M1N to the battery cells B1 to BN. The second operation is the operation corresponding to the case where the representative voltage induced in the primary windings M11 to M1N is similar to the voltages of the battery cells B1 to BN, so that the charge simultaneously flows both from the primary windings M11 to M1N and from the battery cells B1 to BN, and magnetizing current is formed on the magnetizing inductors.

Finally, when all of the first switches S1 to SN are simultaneously turned off, the flow of charge moving to the battery cells B1 to BN (when a charge moves to a battery having a low potential) is stopped, and magnetizing current of magnetizing inductors of all of the transformers T1 to TN flows into the 14V battery BO, essentially provided in a vehicle, through the secondary windings M21 to M2N of the transformers T1 to TN and the second body diode BDO of the second switch SO.

3) Case where battery cells having a high potential are selected and some of first switches corresponding to the battery cells are turned on (when only some selected first switches are turned on)

First, when the first switches S1 to SN corresponding to selected battery cells B1 to BN are simultaneously turned on according to a predetermined duty ratio, the voltages of the battery cells B1 to BN are intended to be applied to the primary windings M11 to M1N of corresponding transformers T1 to TN.

Further, the voltages applied to the primary windings M11 to M1N are induced in the secondary windings M21 to M2N through the transformers T1 to TN. All of the secondary windings M21 to M2N are electrically connected in parallel with each other, so that the highest voltage of the voltages induced in the secondary windings M21 to M2N is determined to be a representative voltage of the secondary windings M21 to M2N. For reference, in this case, the representative voltage is the voltage of the battery cell B1 to BN having the highest potential among the selected battery cells B1 to BN. Next the representative voltage of the secondary windings M21 to M2N is induced in the primary windings M11 to M1N of all of the transformers T1 to TN, thus causing the following two operations. The first operation is the operation corresponding to the case where the representative voltage induced in the primary windings M11 to M1N is much higher than the voltages of the battery cells B1 to BN, so that magnetizing current is supplied to magnetizing inductors (not shown) at the same time that a charge is caused to flow from the primary windings M11 to M1N to the battery cells B1 to BN. The second operation is the operation corresponding to the case where the representative voltage induced in the primary windings M11 to M1N is similar to the voltages of the battery cells B1 to BN, so that charge simultaneously flows both from the primary windings M11 to M1N and from the battery cells B1 to BN, thus forming magnetizing current on the magnetizing inductors. In this case, the battery cells, from which charge flows, are some of the battery cells corresponding to the turned-on first switches. Finally, when all of the selected first switches S1 to SN are simultaneously turned off, the flow of charge moving to the battery cells B1 to BN (when charge moves to battery cells having a low potential) is stopped, and magnetizing current of the magnetizing inductors of all of the transformers T1 to TN flows into the 14V battery BO, essentially provided in a vehicle, through the secondary windings M21 to M2N of the transformers T1 to TN and the second body diode BDO of the second switch SO.

Meanwhile, when an arbitrary battery cell B1 to BN, constituting the series-connected battery cells B1 to BN, is in a low charged state, a charge equalization operation is stopped, and the second switch SO interposed between the secondary windings M21 to M2N of the transformers T1 to TN and the 14V battery BO is driven, thus causing charge to flow from the 14V battery BO to the series-connected battery cells B1 to BN. In detail, when the second switch SO is turned on, current flowing from the 14V battery BO is stored as magnetic energy in all of the parallel-connected transformers T1 to TN through the secondary windings M21 to M2N of the transformers T1 to TN. After the second switch SO is turned off, charge moves to respective battery cells B1 to BN through the primary windings M1 to M1N. Herein, it should be noted that, when charge moves from the 14V battery BO to the low charged battery cell B1 to BN of the series-connected battery cells B1 to BN, a relatively large amount of charge moves to the battery cell B1 to BN having a relatively low potential, thus additionally performing charge equalization.

Figure 3:
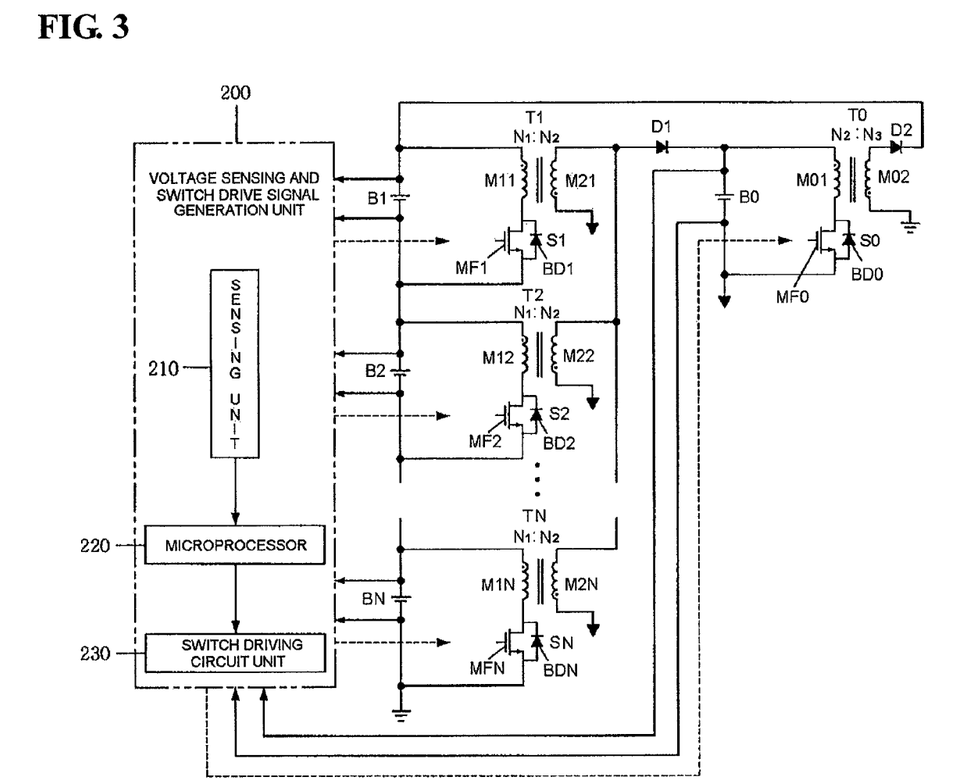
FIG. 3 is a diagram showing the construction of a charge equalization apparatus with the parallel connection of the secondary windings of multiple transformers according to another embodiment of the present invention.

FIG. 3 is a diagram showing the construction of a charge equalization apparatus with the parallel connection of the secondary windings of multiple transformers according to another embodiment of the present invention.

The construction and operation of the charge equalization apparatus with the parallel connection of the secondary windings of multiple transformers of FIG. 3 are similar to those of the charge equalization apparatus of FIG. 2, and, hereinafter, a description is made on the basis of the differences therebetween.

As shown in FIG. 3, a first unidirectional rectifier diode D1 is interposed, instead of the second switch SO of FIG. 2, between the secondary windings M21 to M2N of transformers, which are electrically connected in parallel with each other, and a battery BO. An easily implemented DC/DC converter (for example, a flyback converter), composed of a second transformer TO, a third switch SO, and a second rectifier diode D2, is connected in parallel with the battery BO.

In this case, the number of turns in the primary winding MO1 of the second transformer TO may be equal to or different from the number of turns N2 in the secondary windings of the first transformers T1 to TN, but the turns ratio of the second transformer TO is maintained at N2:N3, the polarities of the primary and secondary windings thereof are opposite each other, and the second rectifier diode D2 is connected in series with the secondary winding MO2 of the transformer TO. Further, a third switch SO is composed of a MOSFET MFO and a third body diode BDO connected in a reverse direction between the drain and source of the MOSFET MFO.

According to this construction, magnetizing current flowing through magnetizing inductors (not shown) disposed on the primary windings M11 to M1N flows only into the battery BO through the secondary windings M21 to M2N and the first rectifier diode D1 when the switches S1 to SN are turned off.

Further, when an arbitrary battery cell B1 to BN, constituting series-connected battery cells B1 to BN, is in a low charged state, or when the potential of the battery BO increases up to a predetermined potential or has the possibility of increasing to the predetermined potential during the operation of the charge equalization apparatus, the charge equalization apparatus of FIG. 3 drives the DC/DC converter connected in parallel with the battery BO, that is, turns on the third switch SO, thus causing a charge to flow from the battery BO to the series-connected battery cells B1 to BN.

Since such a two-stage structure can independently drive a second stage (component after the first rectifier D1), regardless of the operation of a first stage (component before the first rectifier D1), there is an advantage in that the voltage of the battery B0 can be flexibly managed according to the power capability of the second stage.

Figure 4:
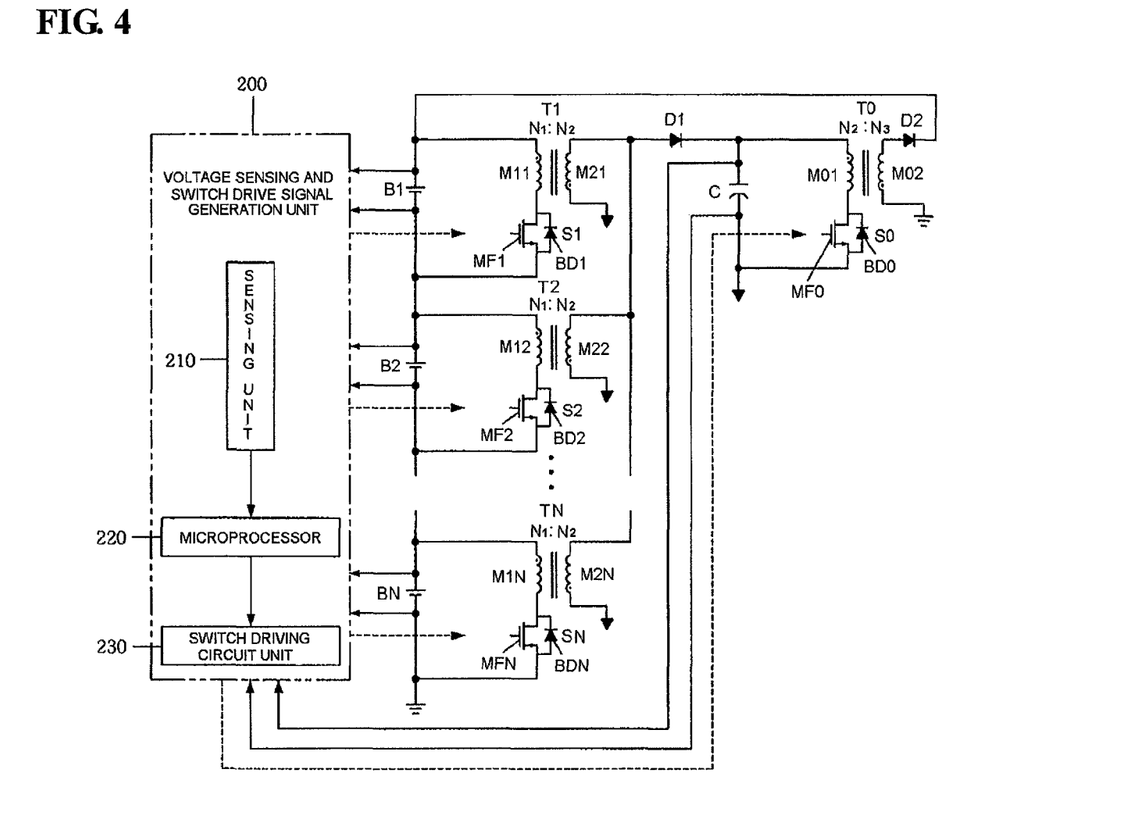
FIG. 4 is a diagram showing the construction of a charge equalization apparatus with the parallel connection of the secondary windings of multiple transformers according to a further embodiment of the present invention.

FIG. 4 is a diagram showing the construction of a charge equalization apparatus with the parallel connection of the secondary windings of multiple transformers according to a further embodiment of the present invention.

The construction and operation of the charge equalization apparatus with the parallel connection of the secondary windings of multiple transformers of FIG. 4 are similar to those of FIG. 3, and, hereinafter, a description is made on the basis of the differences therebetween.

In the charge equalization apparatus of FIG. 4, a capacitor C substitutes for the battery BO of FIG. 3. Since the capacitor has a smaller energy capacity than the 14V battery BO mounted on a vehicle, the DC-DC converter of a second stage, composed of a second transformer TO, a third switch SO, and a second rectifier diode D2, starts to operate immediately when energy is stored in the capacitor C. As a result, energy is immediately transferred to the series-connected battery cells B1 to BN.

Figure 5:
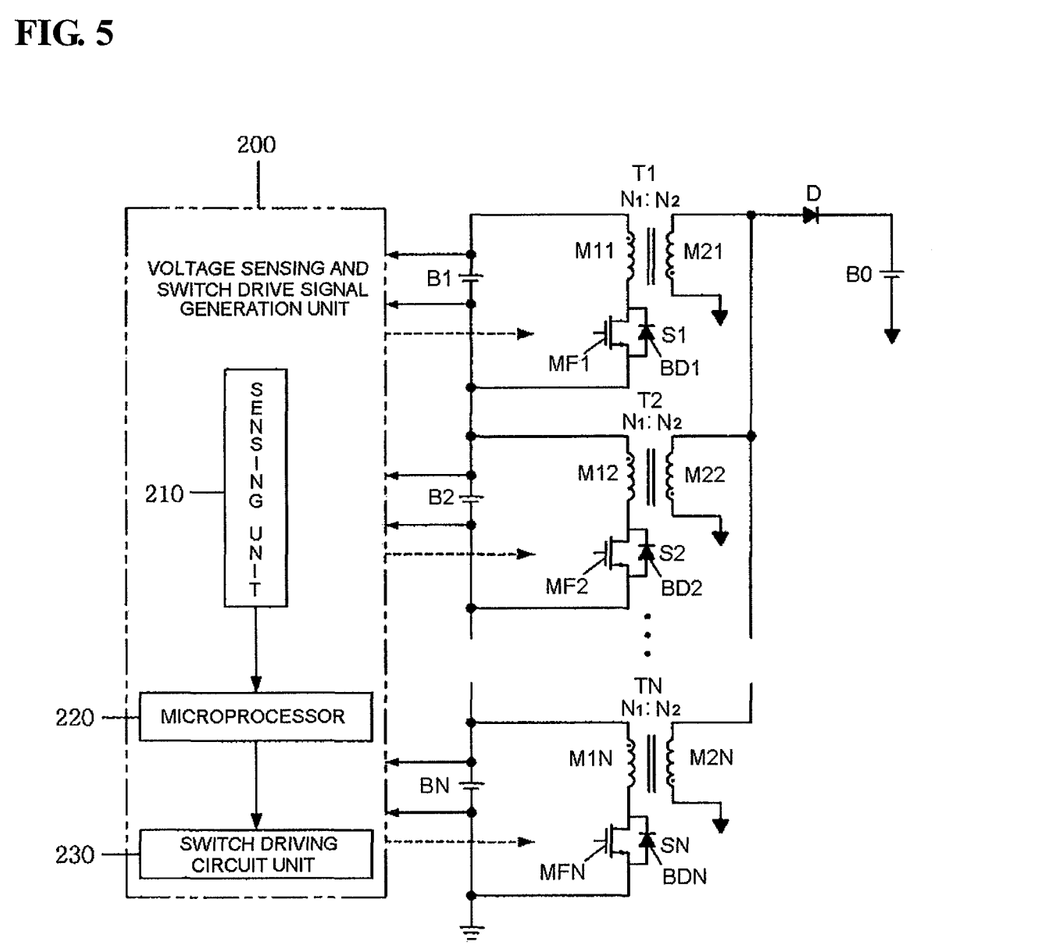
FIG. 5 is a diagram showing the construction of a charge equalization apparatus with the parallel connection of the secondary windings of multiple transformers according to yet another embodiment of the present invention.

FIG. 5 is a diagram showing the construction of a charge equalization apparatus with the parallel connection of the secondary windings of multiple transformers according to yet another embodiment of the present invention.

The charge equalization apparatus of FIG. 5 is similar to that of FIG. 3, and, hereinafter, a description is made on the basis of the differences therebetween.

In FIG. 5, a DC/DC converter, connected in parallel with the battery BO in FIG. 3, is omitted. This causes the charge of an overcharged battery BO to be merely discharged through the battery BO. This construction realizes a charge equalization method suitable for the case where the amount of charge to be discharged is small and the capacity of the battery BO is sufficiently large to accommodate the amount of charge to be discharged.

Figure 6:
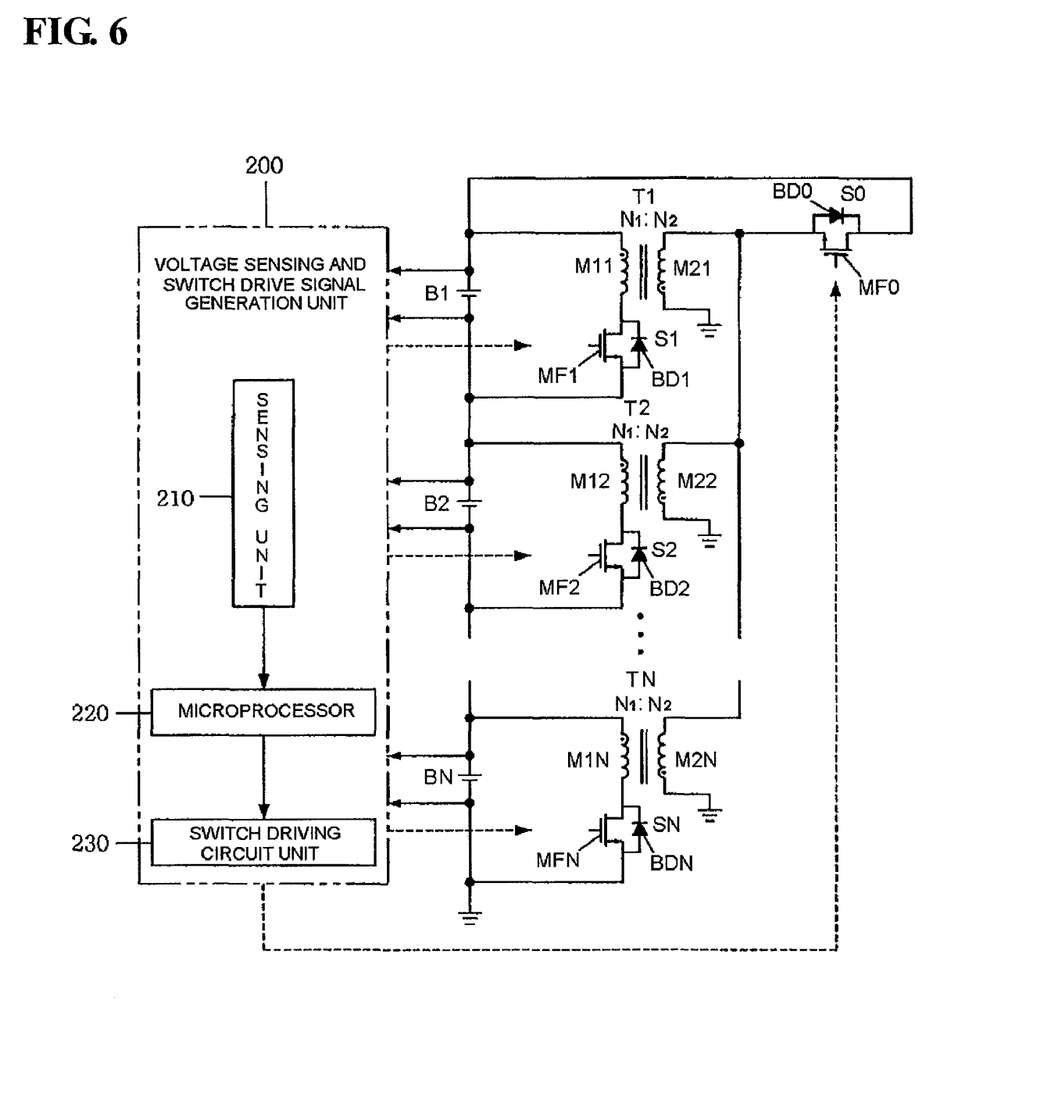
FIG. 6 is a diagram showing the construction of a charge equalization apparatus with the parallel connection of the secondary windings of multiple transformers according to still another embodiment of the present invention.

FIG. 6 is a diagram showing the construction of a charge equalization apparatus with the parallel connection of the secondary windings of multiple transformers according to still another embodiment of the present invention.

The charge equalization apparatus of FIG. 6 is similar to that of FIG. 2, and, hereinafter, a description is made on the basis of the differences therebetween.

In the charge equalization apparatus of FIG. 6, series-connected battery cells B1 to BN are connected in series with a second switch SO. In the charge equalization apparatus, magnetic energy remaining in transformers T1 to TN is recharged in the series-connected battery cells B1 to BN through the second switch SO when first switches S1 to SN are turned off. When the potential of a specific battery cell B1 to BN is low, the second switch SO is driven, thus causing a relatively larger amount of charge than that of a battery cell having a high potential to flow from the series-connected battery cells B1 to BN to the battery cell B1 to BN having a low potential.

Figure 7:
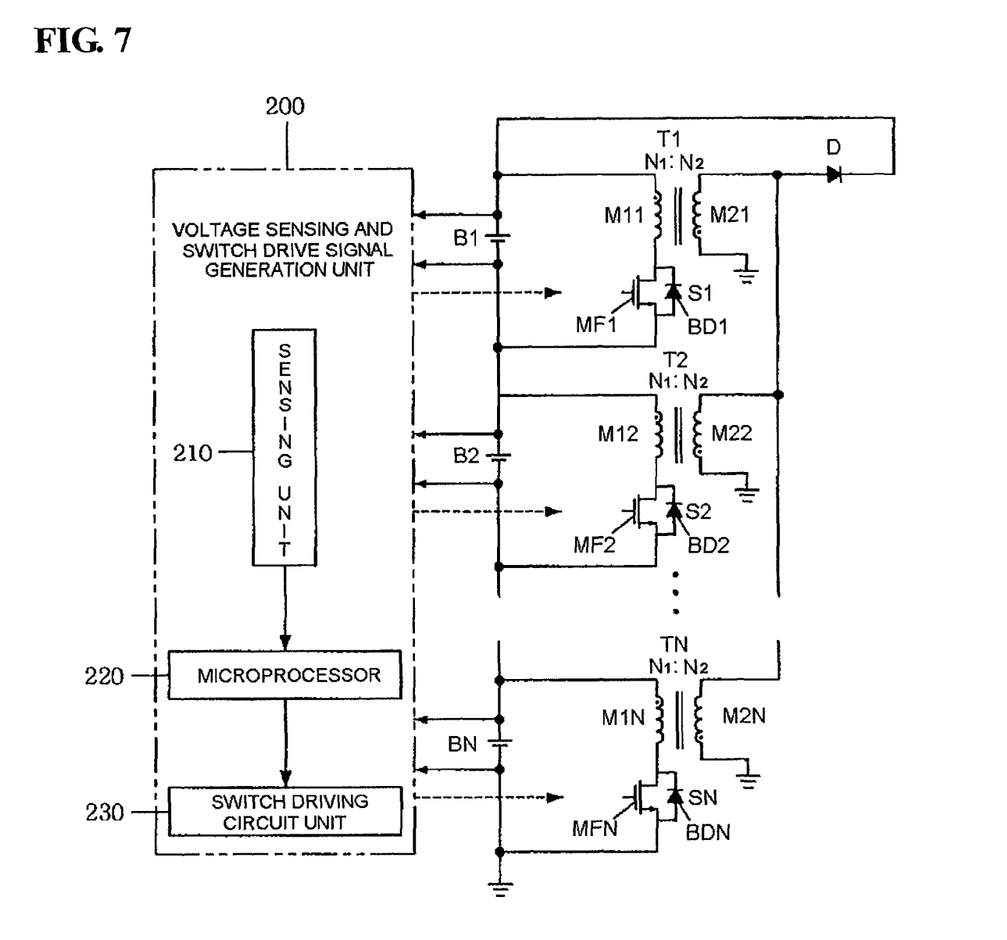
FIG. 7 is a diagram showing the construction of a charge equalization apparatus with the parallel connection of the secondary windings of multiple transformers according to still another embodiment of the present invention.

FIG. 7 is a diagram showing the construction of a charge equalization apparatus with the parallel connection of the secondary windings of multiple transformers according to still another embodiment of the present invention.

The charge equalization apparatus of FIG. 7 is similar to that of FIG. 6, and, hereinafter, a description is made on the basis of the differences therebetween.

In the charge equalization apparatus of FIG. 7, a rectifier diode D is disposed, instead of the second switch SO of FIG. 6. In this construction, magnetic energy remaining in transformers T1 to TN, is recharged in series-connected battery cells B1 to BN through the rectifier diode D when first switches S1 to SN are turned off.

Figure 8:
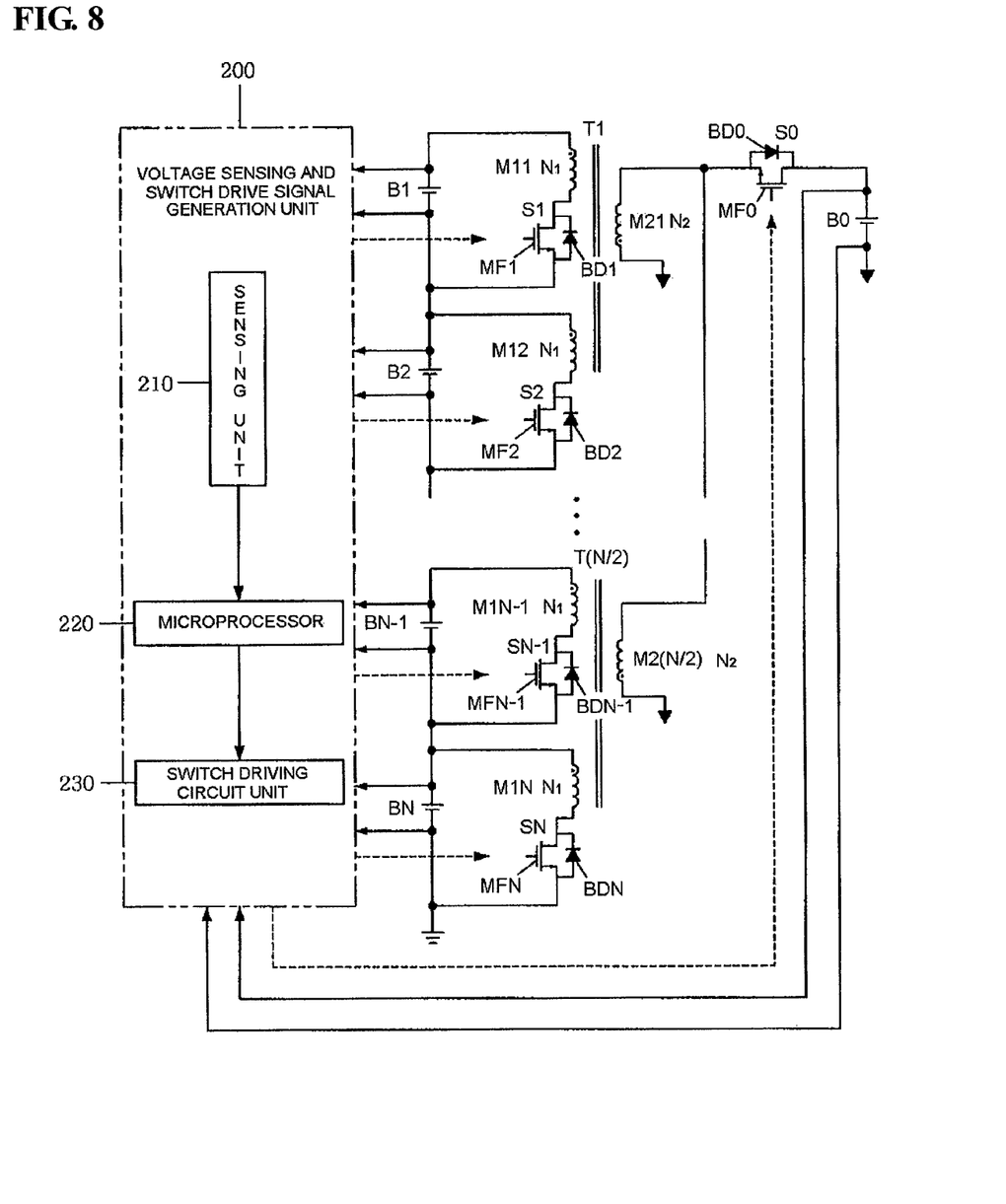
FIG. 8 is a diagram showing the construction of a charge equalization apparatus with the parallel connection of the secondary windings of multiple transformers according to still another embodiment of the present invention.

FIG. 8 is a diagram showing the construction of a charge equalization apparatus with the parallel connection of the secondary windings of multiple transformers according to still another embodiment of the present invention.

The charge equalization apparatus of FIG. 8 is similar to that of FIG. 2, and, hereinafter, a description is made on the basis of the differences therebetween.

The charge equalization apparatus of FIG. 8 has a structure in which two primary windings M11 to M1N are wound around a single transformer T1 to T(N/2), and first switches S1 to SN are connected in series with respective primary windings M11 to M1N, and thereafter battery cells B1 to BN are connected in parallel therewith.

In the operation of the charge equalization apparatus having the above construction, two operations are combined with each other, one indicating an operation performed when the battery cells B1 and B2, B3 and B4, . . . , BN−1 and BN form respective pairs, the other indicating an operation performed between the two battery cells B1 and B2, B3 and B4, . . . . BN−1 and BN, forming each pair. The former follows the operation of the charge equalization apparatus of FIG. 2 without change, and the latter follows the operation of the conventional charge equalization apparatus using current switching (refer to FIG. 1).

In the charge equalization apparatus proposed in FIG. 8, the above two operations are combined with each other, and thus a new construction and operation are provided. Further, the proposed charge equalization apparatus is advantageous in that two primary windings M11 to M1N are implemented in each transformer T1 to T(N/2), and thus the number of transformers T1 to T(N/2) is decreased to half.

Figure 9:
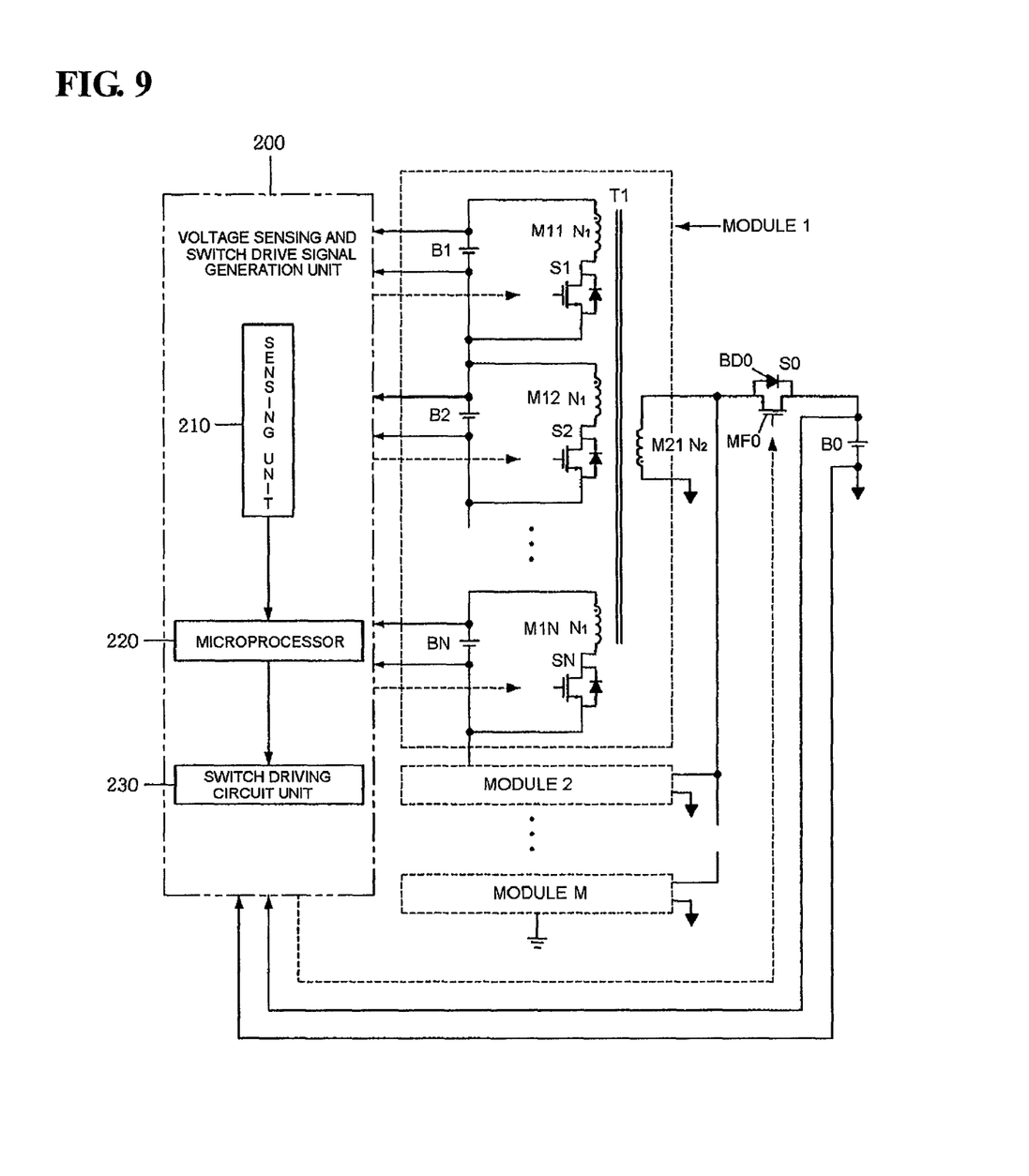
FIG. 9 is a diagram showing the construction of a charge equalization apparatus with the parallel connection of the secondary windings of multiple transformers according to still another embodiment of the present invention.

FIG. 9 is a diagram showing the construction of a charge equalization apparatus with the parallel connection of the secondary windings of multiple transformers according to still another embodiment of the present invention.

The charge equalization apparatus of FIG. 9 is similar to that of FIG. 8, and, hereinafter, a description is made on the basis of the differences therebetween.

The charge equalization apparatus of FIG. 9 has a structure in which n primary windings are wound around a single transformer T1, and first switches S1-1 to S1-N are connected in series with respective primary windings M1-11 to M1-1N, and then battery cells B1-1 to B1-N are connected in parallel therewith.

When this structure is assumed to be a basic unit (module), the charge equalization apparatus of FIG. 9 has m basic units. The charge equalization apparatus of FIG. 9 is the typical form of a charge equalization apparatus proposed in the present invention. When n=1, the charge equalization apparatus of FIG. 2 is implemented, and when n=2, the charge equalization apparatus of FIG. 8 is implemented.

Meanwhile, the present invention can perform charge equalization operation when the potentials of respective battery cells, which are connected in series with each other, are different from each other in the situation in which an electrical charging device or an electrical load is not connected to the series-connected battery cells. However, even if an electrical charging device or electrical load is connected, a charge equalization operation can also be performed even in the situation in which an electrical charging device or an electrical load is connected when a current carrying capacity is sufficiently large to allow the primary windings of transformers and switches to function as a bypass circuit, or when the amount of charge current or discharge current is small.

What is claimed:

1. A charge equalization apparatus, comprising:
    a plurality of transformers having primary windings and secondary windings wound around the transformers, the primary windings being connected in parallel with batteries, the secondary windings being connected in parallel with each other;
    a plurality of first switches respectively connected in series with the primary windings of the transformers and adapted to control flow of current of the primary windings in a first direction or a second direction; a plurality of battery cells connected in series with each other, the battery cells being connected in parallel with the primary windings of the transformers; and
    a voltage sensing and switch drive signal generation unit for sensing voltages of the plurality of battery cells, thus turning on/off the plurality of first switches, wherein the charge equalization apparatus is operated such that, when one or more of the first switches are turned on, current flows into one or more primary windings connected to the turned-on first switches in the first direction, so that current is induced in the second windings, and current is induced in the primary windings because of the current induced in the secondary windings, thus enabling equalized charge to be distributed to the plurality of battery cells.

2. The charge equalization apparatus according to claim 1, wherein the primary windings and secondary windings of the transformers form structures of respective flyback converters.

3. The charge equalization apparatus according to claim 1, wherein the plurality of transformers have a same turns ratio.

4. The charge equalization apparatus according to claim 1, wherein the first switches are implemented as one type selected from among Metal-Oxide Semiconductor Field-Effect Transistor (MOSFET) switches, Bipolar Junction Transistor (BJT) switches, and relay switches, and have bidirectionality.

5. The charge equalization apparatus according to claim 1, further comprising:
    a charging means connected in parallel with the parallel-connected secondary windings; and
    a second switch interposed between first ends of the parallel-connected secondary windings and the battery, and adapted to control flow of current from the secondary windings to the battery and flow of current from the battery to the secondary windings.

6. The charge equalization apparatus according to claim 1, further comprising:
    a charging means connected in parallel with the parallel-connected secondary windings; and
    a current transfer device interposed between first ends of the parallel-connected secondary windings and the battery, and adapted to provide flow of current from the secondary windings to the battery.

7. The charge equalization apparatus according to claim 6, further comprising:
    a second transformer having a primary winding connected to the charging means;
    a secondary winding connected to the series-connected battery cells;
    a third switch connected in series with the primary winding of the second transformer; and
    a second current transfer device interposed between the secondary winding of the second transformer and the battery cells.

8. The charge equalization apparatus according to claim 1, further comprising a second switch interposed between first ends of the parallel-connected secondary windings and a first end of the series-connected battery cells, and adapted to control flow of current from the secondary windings to the battery cells and flow of current from the battery cells to the secondary windings.

9. The charge equalization apparatus according to claim 1, further comprising a current transfer device interposed between first ends of the parallel-connected secondary windings and a first end of the series-connected battery cells, and adapted to control flow of current from the secondary windings to the battery cells.

10. A charge equalization apparatus, comprising:
    a plurality of transformers, each having a plurality of primary windings and a single secondary winding wound around a single core, the primary windings being connected in parallel with respective battery cells, the secondary windings of the transformers being connected in parallel with each other;
    a plurality of first switches connected in series with the primary windings of the transformers and adapted to control flow of current of the primary windings in a first direction or a second direction;
    a plurality of battery cells connected in series with each other, the battery cells being connected in parallel with the primary windings of the transformers; and
    a voltage sensing and switch drive signal generation unit for sensing voltages of the plurality of battery cells, thus turning on/off the first switches, wherein the charge equalization apparatus is operated such that, when one or more of the first switches are turned on, current flows into one or more primary windings connected to the turned-on first switches in the first direction, so that current is induced in the second windings, and current is induced in the primary windings because of the current induced in the secondary windings, thus enabling equalized charge to be distributed to the plurality of battery cells.

11. The charge equalization apparatus according to claim 10, wherein the primary windings and secondary windings of the plurality of transformers form structures of respective flyback converters.

12. The charge equalization apparatus according to claim 10, further comprising:
   a charging means connected in parallel with the parallel-connected secondary windings; and
   a second switch interposed between first ends of the parallel-connected secondary windings and the battery, and adapted to control flow of current from the secondary windings to the battery and flow of current from the battery to the secondary windings.

13. The charge equalization apparatus according to claim 10, further comprising:
   a charging means connected in parallel with the parallel-connected secondary windings; and
   a current transfer device interposed between first ends of the parallel-connected secondary windings and the battery, and adapted to provide flow of current from the secondary windings to the battery.

14. The charge equalization apparatus according to claim 10, further comprising:
   a second transformer having a primary winding connected to the charging means and a secondary winding connected to the series-connected battery cells;
   a third switch connected in series with the primary winding of the second transformer; and
   a second current transfer device interposed between the secondary winding of the second transformer and the battery cells.

15. The charge equalization apparatus according to claim 10, further comprising a second switch interposed between first ends of the parallel-connected secondary windings and a first end of the series-connected battery cells, and adapted to control flow of current from the secondary windings to the battery cells and flow of current from the battery cells to the secondary windings.

16. The charge equalization apparatus according to claim 10, further comprising a current transfer device interposed between first ends of the parallel-connected secondary windings and a first end of the series-connected battery cells, and adapted to control flow of current from the secondary windings to the battery cells.

* * * * *